United States Patent
Kim et al.

(10) Patent No.: US 11,996,523 B2
(45) Date of Patent: May 28, 2024

(54) SECONDARY BATTERY

(71) Applicant: SAMSUNG ELECTRO-MECHANICS CO., LTD., Suwon-si (KR)

(72) Inventors: Young Mi Kim, Suwon-si (KR); Tai Young Kim, Suwon-si (KR); Kwang Wook Bae, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 276 days.

(21) Appl. No.: 16/842,467

(22) Filed: Apr. 7, 2020

(65) Prior Publication Data

US 2021/0111425 A1    Apr. 15, 2021

(30) Foreign Application Priority Data

Oct. 11, 2019  (KR) .................. 10-2019-0125951

(51) Int. Cl.
*H01M 10/058*   (2010.01)
*H01M 10/0525*  (2010.01)
*H01M 50/54*    (2021.01)

(52) U.S. Cl.
CPC ..... *H01M 10/058* (2013.01); *H01M 10/0525* (2013.01); *H01M 50/54* (2021.01);
(Continued)

(58) Field of Classification Search
None
See application file for complete search history.

(56) References Cited

U.S. PATENT DOCUMENTS

| 2013/0260257 | A1  | 10/2013 | Choi |
| 2014/0023921 | A1* | 1/2014  | Lee .............. H01M 4/366 |
|              |     |         | 427/126.6 |

(Continued)

FOREIGN PATENT DOCUMENTS

| CN | 103367798 A | 10/2013 |
| CN | 109494347 A | 3/2019 |

(Continued)

OTHER PUBLICATIONS

JP2013073855A—Machine Translation (Year: 2013).*

(Continued)

*Primary Examiner* — Brian R Ohara
*Assistant Examiner* — Patrick Marshall Greene
(74) *Attorney, Agent, or Firm* — Morgan, Lewis & Bockius LLP (57) ABSTRACT

A secondary battery includes a body including a solid electrolyte layer, and a positive electrode and a negative electrode disposed with the solid electrolyte layer interposed therebetween; and first and second external electrodes respectively disposed on one surface and the other surface of the body, opposite to the one surface, and respectively connected to the positive electrode and the negative electrode, wherein the positive electrode comprises a positive electrode active material layer and a first electrolytic mixing portion disposed at an interface of the positive electrode in contact with the solid electrolyte layer. The first electrolytic mixing portion is a mixture of a positive electrode active material and a liquid phase and/or gel phase electrolyte.

18 Claims, 6 Drawing Sheets

(52) U.S. Cl.
CPC .............. *H01M 2300/0068* (2013.01); *H01M 2300/0085* (2013.01); *H01M 2300/0091* (2013.01)

(56) References Cited

U.S. PATENT DOCUMENTS

| | | | |
|---|---|---|---|
| 2020/0006819 A1 | 1/2020 | Lee et al. | |
| 2020/0075959 A1* | 3/2020 | Anandan | H01M 10/0525 |
| 2020/0343580 A1* | 10/2020 | Yushin | H01M 10/056 |
| 2021/0083321 A1* | 3/2021 | Ito | H01M 50/54 |
| 2021/0175540 A1* | 6/2021 | Allenic | H01M 10/052 |
| 2022/0231389 A1* | 7/2022 | Miyaki | H01M 50/548 |
| 2022/0238913 A1* | 7/2022 | Chikagawa | H01M 50/543 |

FOREIGN PATENT DOCUMENTS

| | | | |
|---|---|---|---|
| CN | 109659626 A | | 4/2019 |
| JP | 2004-158306 A | | 6/2004 |
| JP | 2013073855 A | * | 4/2013 |
| JP | 2016-100088 A | | 5/2016 |
| KR | 10-2013-0111833 A | | 10/2013 |
| KR | 10-2018-0015841 A | | 2/2018 |

OTHER PUBLICATIONS

Chinese Office Action dated Dec. 7, 2023 issued in Chinese Patent Application No. 202010640763.8 which includes Chinese Search Report dated Dec. 5, 2023 (along with English translation of both).

* cited by examiner

SECONDARY BATTERY

CROSS-REFERENCE TO RELATED APPLICATION

This application claims benefit of priority to Korean Patent Application No. 10-2019-0125951 filed on Oct. 11, 2019 in the Korean Intellectual Property Office, the disclosure of which is incorporated herein by reference in its entirety.

TECHNICAL FIELD

The present disclosure relates to a secondary battery.

BACKGROUND

Recently, devices using electricity as an energy source are increasing. With the expansion of applications of electricity, such as smartphones, camcorders, notebook PCs, electric vehicles, or the like, interest in electric storage devices using electrochemical elements is increasing. Among various electrochemical elements, lithium secondary batteries that may be charged and discharged, have a high operating voltage, and have a large energy density, have been in the spotlight.

A lithium secondary battery may be manufactured by applying a material capable of intercalating and de-intercalating lithium ions into a positive electrode and a negative electrode, and injecting a liquid phase electrolyte between the positive electrode and the negative electrode, and electricity may be generated or consumed by the reduction or oxidation reaction of the lithium secondary battery intercalating and de-intercalating the lithium ions in the negative electrode and the positive electrode. Such a lithium secondary battery should basically be stable in the operating voltage range of the battery, and should have performance capable of transferring ions at a sufficiently high speed.

When a liquid phase electrolyte such as a nonaqueous electrolyte is used in the lithium secondary battery, the discharge capacity and the energy density may be advantageously high. However, since high voltage lithium secondary batteries are difficult to be implemented, there may be problems such as relatively high risks of electrolyte leakage, fires, and explosions.

In order to solve the above problems, a secondary battery using a solid electrolyte, instead of a liquid phase electrolyte, has been proposed as an alternative. The solid electrolyte may be classified as a polymer-based solid electrolyte and a ceramic-based solid electrolyte, among which the ceramic-based solid electrolyte has an advantage of illustrating high stability. However, in the case of the ceramic-based solid electrolyte, there may be a problem that ion conductivity is lowered or charge/discharge efficiency is lowered due to poor interface contact between an electrolyte and an electrode, an interfacial side reaction, or the like.

SUMMARY

An aspect of the present disclosure is to provide a secondary battery with improved contact between an electrode and an electrolyte.

Another aspect of the present disclosure is to provide a secondary battery having relatively high ion conductivity.

Another aspect of the present disclosure is to provide a secondary battery having excellent charge and discharge efficiency.

According to an aspect of the present disclosure, a secondary battery includes a body including a solid electrolyte layer, and a positive electrode and a negative electrode disposed with the solid electrolyte layer interposed therebetween; and first and second external electrodes respectively disposed on one surface and the other surface of the body, opposite to the one surface, and respectively connected to the positive electrode and the negative electrode, wherein the positive electrode comprises a positive electrode active material layer and a first electrolytic mixing portion disposed at an interface of the positive electrode in contact with the solid electrolyte layer. The first electrolytic mixing portion is a mixture of a positive electrode active material and a liquid phase and/or gel phase electrolyte.

According to an aspect of the present disclosure, a secondary battery includes a body including a solid electrolyte layer, and a positive electrode and a negative electrode disposed with the solid electrolyte layer interposed therebetween; and first and second external electrodes respectively disposed on one surface and the other surface of the body, opposite to the one surface, and respectively connected to the positive electrode and the negative electrode. The negative electrode includes a second electrolytic mixing portion of a negative electrode active material and a liquid phase and/or gel phase electrolyte, disposed at an interface of the negative electrode in contact with the solid electrolyte layer.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, embodiments of the present disclosure will now be described in detail with reference to the accompanying drawings. The present disclosure may, however, be exemplified in many different forms and should not be construed as being limited to the specific embodiments set forth herein. Further, embodiments of the present disclosure may be provided for a more complete description of the present disclosure to those skilled in the art. Accordingly, the shapes and sizes of the elements in the drawings may be exaggerated for clarity of description, and the elements denoted by the same reference numerals in the drawings may be the same elements.

In order to clearly illustrate the present disclosure, portions not related to the description are omitted, and thicknesses are enlarged in order to clearly represent layers and regions, and similar portions having the same functions within the same scope are denoted by similar reference numerals throughout the specification. Throughout the specification, when an element is referred to as "comprising", it means that it may include other elements as well, rather than excluding other elements, unless specifically stated otherwise.

In the drawings, an X direction may be defined as a first direction, an L direction, or a length direction, a Y direction may be defined as a second direction, a W direction, or a width direction, and a Z direction defined as a third direction, a T direction, or a thickness direction.

Hereinafter, a secondary battery according to an embodiment of the present disclosure will be described in detail with reference to the accompanying drawings. Referring to FIGS. 1 to 4B, a secondary battery 100 or 200 according to the present disclosure may include a body 110 or 210 including a solid electrolyte layer 111 or 211, and a positive electrode 121 or 221 and a negative electrode 122 or 222 disposed with the solid electrolyte layer 111 or 211 interposed therebetween; and first and second external electrodes 131 or 231, and 132 or 232 respectively disposed on one surface and the other surface of the body 110 or 210, opposite to the one surface, and respectively connected to the positive electrode 121 or 221 and the negative electrode 122 or 222. The positive electrode 121 or 221 may include a positive electrode active material layer and a first electrolytic mixing portion 151 or 251 disposed at an interface of the positive electrode 121 or 221 in contact with the solid electrolyte layer 111 or 211.

In this case, the first electrolytic mixing portion 151 or 251 may be a mixture of a positive electrode active material and a liquid phase and/or gel phase electrolyte. The positive electrode active material and the liquid phase and/or gel phase electrolyte may be randomly mixed, for example, but are not limited thereto. In the present specification, the first electrolytic mixing portion may refer to a region in which the positive electrode active material and the liquid phase and/or gel phase electrolyte are present together. For example, referring to FIGS. 3A and 3B, the first electrolytic mixing portion may refer to a region (e.g., 151 or 251) in which the positive electrode active material of the positive electrode 121 or 221, and the liquid phase and/or gel phase electrolyte present in a region in which the positive electrode active material is not disposed, are disposed together.

The positive electrode 121 or 221 included in the secondary battery 100 or 200 according to the present disclosure may have a recess or a pore, formed on surfaces thereof. The recess may refer to a shape in which a groove is formed on the surfaces of the positive electrode 121 or 221, and the pore may refer to a void disposed below the surfaces of the positive electrode 121 or 221. When the positive electrode 121 or 221 of the secondary battery according to the present disclosure has the pore, the surfaces of the positive electrode 121 or 221 may be porous.

When the recess is formed on the surfaces of the positive electrode 121 or 221, an average surface roughness of the positive electrode 121 or 221 may be 1.0 µm or more. In the present specification, the average surface roughness Ra of a surface may be a value measured using an optical surface profiler such as 7300 Optical Surface Profiler by Zygo Corporation, or a value measured using a surface roughness meter SV-3200 by Mitutoyo Corporation. The average surface roughness of the positive electrode 121 or 221 may be 1.0 µm or more, 1.2 µm or more, 1.4 µm or more, 1.6 µm or more, 1.8 µm or more, or 2.0 µm or more, but is not limited thereto. In addition, an upper limit of the average surface roughness Ra of the positive electrode 121 or 221 of the secondary battery according to the present disclosure is not particularly limited, but may be, for example, 100 µm or less.

When the pore is formed on the surfaces of the positive electrode 121 or 221, porosity of the pore may be in the range of 0.1 to 0.8. In the present specification, the porosity may refer to a value representing an area occupied by the pore relative to the total area. The porosity may be obtained through an electron scanning microscope analysis, a BET method, or the like. For example, the porosity may be obtained using an image of an electron scanning microscope capturing a cross-section of the positive electrode.

In an embodiment of the present disclosure, the liquid phase and/or gel phase electrolyte may be filled in the recess and/or pore disposed on the surfaces of the positive electrode 121 or 221. The liquid phase may be a concept including a sol. In the present specification, the sol may refer to a colloidal suspension containing solid particles in a liquid medium, and may refer to a phase in which solid particles are dispersed in a liquid. In addition, in the present specification, a gel may refer to a colloidal liquid being solidified into a jelly shape, and may refer to a phase in which solid particles in the liquid form a cross-linked network. The sol and gel may refer to a phase at room temperature and normal pressure (25° C., 1 atmosphere), and the sol and the gel may be mixed in an unclear state of boundary therebetween.

In the secondary battery according to an embodiment of the present disclosure, the recess and/or pore may be disposed on the surfaces of the positive electrode 121 or 221, and the liquid phase and/or gel phase electrolyte may be filled in the recess and/or pore. Contact between the solid electrolyte layer 111 or 211 and the positive electrode 121 or 221 may be improved. In addition, a bottle neck problem on the interface between the solid electrolyte layer 111 or 211 and the positive electrode 121 or 221 may be solved by improving the contact between the solid electrolyte layer 111 or 211 and the positive electrode 121 or 221. Therefore, an energy barrier may be lowered.

Figure 1:
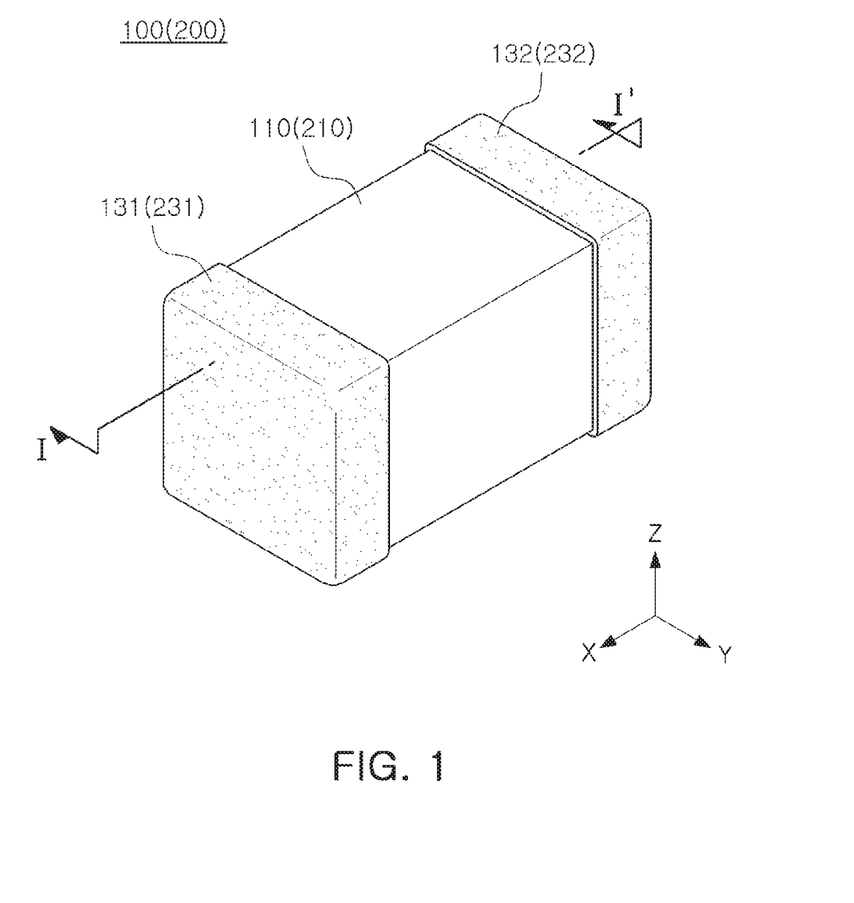
FIG. 1 is a perspective view schematically illustrating a secondary battery according to an embodiment of the present disclosure.
Figure 2A:
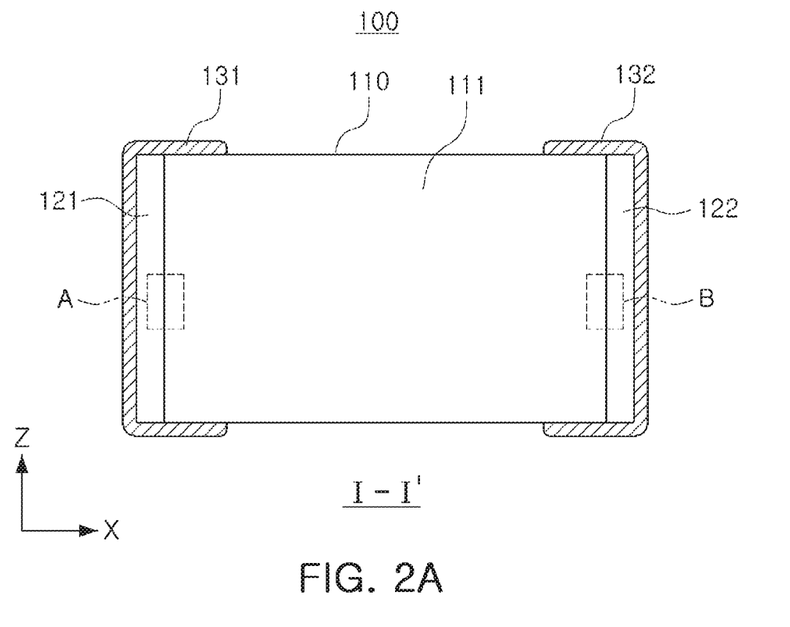
FIGS. 2A and 2B illustrate cross-sectional views taken along line I-I' of FIG. 1.
Figure 2B:
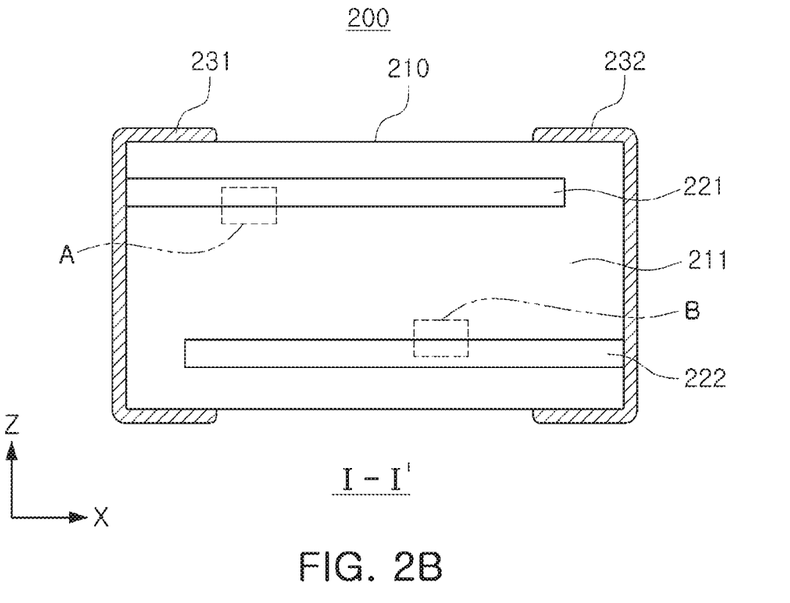
Figure 3A:
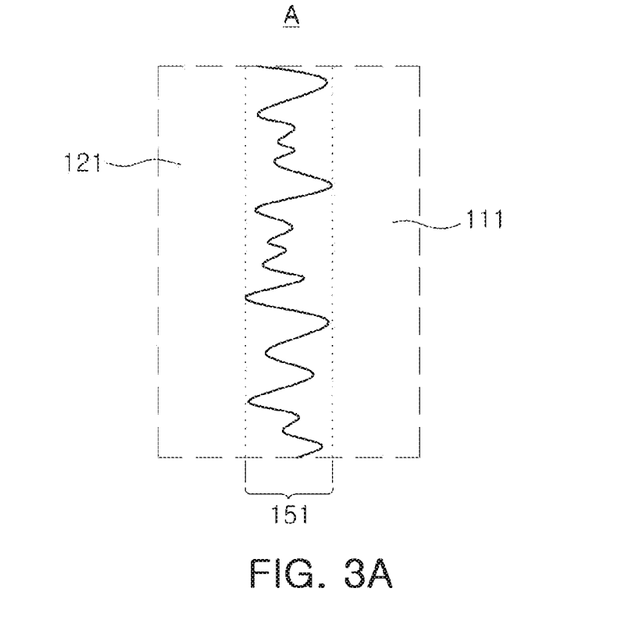
FIGS. 3A and 3B are enlarged views of portion A of FIGS. 2A and 2B, respectively.
Figure 3B:
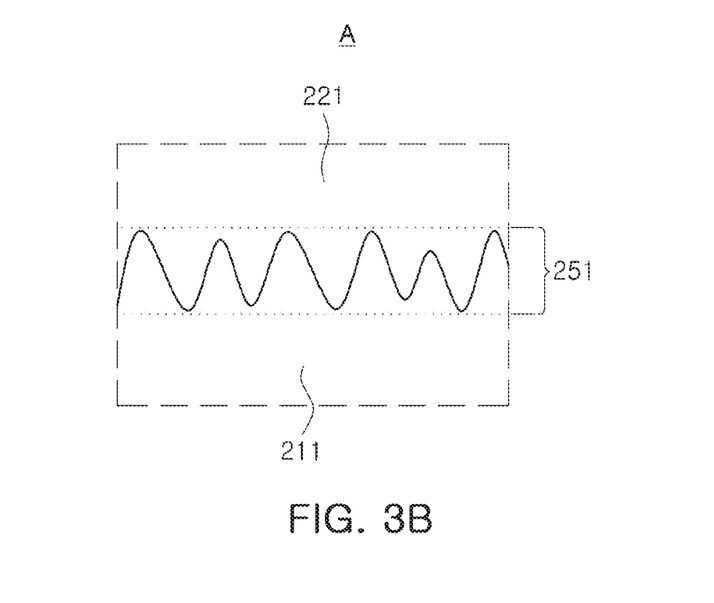
Figure 4A:
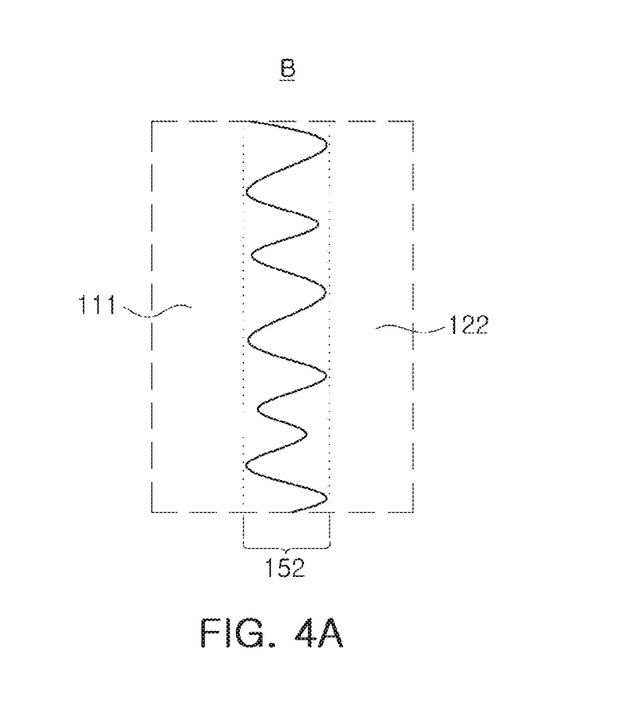
FIGS. 4A and 4B are enlarged views of portion B of FIGS. 2A and 2B, respectively.
Figure 4B:
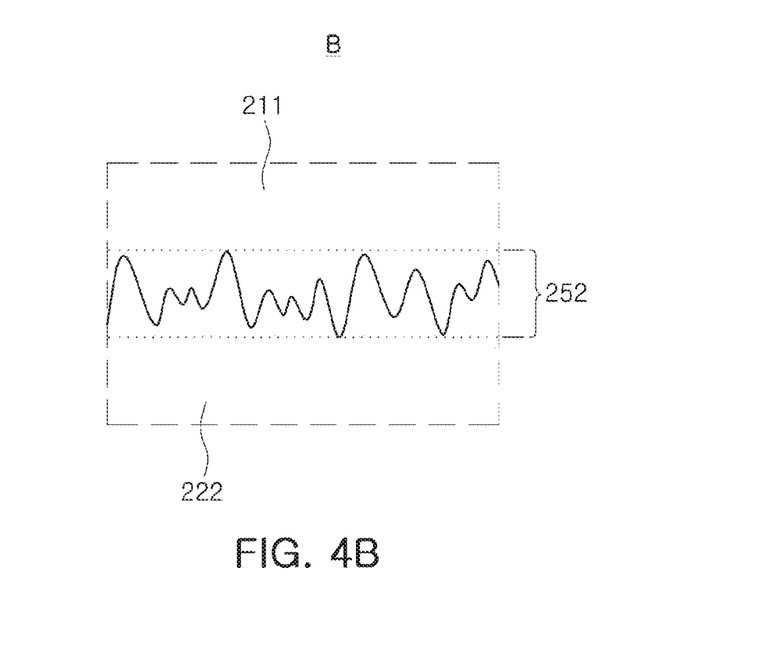

FIGS. 2A and 2B illustrate modifications of a secondary battery according to the present disclosure. Referring to FIGS. 2A and 2B, the positive electrode 121 or 221 and the negative electrode 122 or 222 of the secondary battery 100 or 200 according to the present disclosure may be disposed to face each other in a first direction (an X direction) (FIG. 2A), or may be disposed to face each other in a third direction (a Z direction) (FIG. 2B).

According to an embodiment of the present disclosure, a volume fraction of the liquid phase and/or gel phase electrolyte of the first electrolytic mixing portion 151 or 251 may be in the range of 0.2 to 0.8. The volume fraction may refer to a ratio of a volume of the liquid phase and/or gel phase electrolyte to the total volume of the first electrolytic mixing portion 151 or 251. The total volume of the first electrolytic mixing portion 151 or 251 may be obtained by calculation of a hexahedral geometry, and the volume of the liquid phase and/or gel phase electrolyte may be measured using a specific surface area analyzer such as ASAP-2020 manufactured by Micromeritics Corporation, and the volume of an area in which the positive electrode active material is not present in the first electrolytic mixing portion 151 or 251 may be measured using a surface area and porosimetry analyzer.

In an embodiment of the present disclosure, the positive electrode active material included in the positive electrode 121 or 221 is not particularly limited, as long as it may secure sufficient capacity. For example, the positive electrode active material may include one or more selected from the group consisting of lithium cobalt oxide, lithium nickel cobalt manganese oxide, lithium nickel cobalt aluminum oxide, lithium iron phosphate, and lithium manganese oxide, but is not limited thereto. All positive electrode active materials available in the related art may be used.

The positive electrode active material may be, for example, a compound represented by the following formula: $Li_aA_{1-b}M_bD_2$ (where $0.90 \leq a \leq 1.8$, $0 \leq b \leq 0.5$); $Li_aE_{1-b}MbO_{2-c}D_c$ (where $0.90 \leq a \leq 1.8$, $0 \leq b \leq 0.5$, $0 \leq c \leq 0.05$); $LiE_{2-b}M_bO_{4-c}D_c$ (where $0 \leq b \leq 0.5$, $0 \leq c \leq 0.05$); $Li_aNi_{1-b-c}Co_bM_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Co_bMcO_{2-\alpha}X_\alpha$ (where $0.90 \leq a \leq 1.8$, $0 \leq b \leq 0.5$, $0 \leq c \leq 0.05$, $0 < \alpha < 2$); $Li_aNi_{1-b-c}Co_bMcO_{2-\alpha}X_2$ (where $0.90 \leq a \leq 1.8$, $0 \leq b \leq 0.5$, $0 \leq c \leq 0.05$, $0 < \alpha < 2$); $Li_aNi_{1-b-c}Mn_bM_cD_\alpha$ (where $0.90 \leq a \leq 1.8$, $0 \leq b \leq 0.5$, $0 \leq c \leq 0.05$, $0 < \alpha \leq 2$); $Li_aNi_{1-b-c}Mn_bM_cO_{2-\alpha}X_\alpha$ (where $0.90 \leq a \leq 1.8$, $0 \leq b \leq 0.5$, $0 \leq c \leq 0.05$, $0 < \alpha < 2$); $Li_aNi_{1-b-c}Mn_bM_cO_{2-\alpha}X_2$ (where $0.90 \leq a \leq 1.8$, $0 \leq b \leq 0.5$, $0 \leq c \leq 0.05$, $0 < \alpha < 2$); $Li_aNi_bE_cGdO_2$ (where $0.90 \leq a \leq 1.8$, $0 \leq b \leq 0.9$, $0 \leq c \leq 0.5$, $0.001 \leq d \leq 0.1$); $Li_aNi_bCo_cMn_dGeO_2$ (in the formula, $0.90 \leq a \leq 1.8$, $0 \leq b \leq 0.9$, $0 \leq c \leq 0.5$, $0 \leq d \leq 0.5$, $0.001 \leq e \leq 0.1$); $Li_aNiG_bO_2$ (where $0.90 \leq a \leq 1.8$, $0.001 \leq b \leq 0.1$); $Li_aCoG_bO_2$ (where $0.90 \leq a \leq 1.8$, $0.001 \leq b \leq 0.1$); $Li_aMnG_bO_2$ (where $0.90 \leq a \leq 1.8$, $0.001 \leq b \leq 0.1$); $Li_aMn_2G_bO_4$ (where $0.90 \leq a \leq 1.8$, $0.001 \leq b \leq 0.1$); $QO_2$; $QS_2$; $LiQS_2$; $V_2O_5$; $LiV_2O_2$; $LiRO_2$; $LiNiVO_4$; $Li_{(3-f)}J_2(PO_4)_3$ (where $0 \leq f \leq 2$); $Li_{(3-f)}Fe_2(PO_4)_3$ (where $0 \leq f \leq 2$); and $LiFePO_4$. In the above formula, A is Ni, Co, or Mn; M is Al, Ni, Co, Mn, Cr, Fe, Mg, Sr, V, or a rare-earth element; D is O, F, S, or P; E is Co or Mn; X is F, S, or P; G is Al, Cr, Mn, Fe, Mg, La, Ce, Sr, or V; Q is Ti, Mo or Mn; R is Cr, V, Fe, Sc, or Y; J is V, Cr, Mn, Co, Ni, or Cu.

The positive electrode active material may also be $LiCoO_2$, $LiMn_xO_{2x}$ (where x=1 or 2), $LiNi_{1-x}Mn_xO_{2x}$ (where $0<x<1$), $LiNi_{1-x-y}Co_xMn_yO_2$ (where $0 \leq x \leq 0.5$, $0 \leq y \leq 0.5$), $LiFePO_4$, $TiS_2$, $FeS_2$, $TiS_3$, or $FeS_3$, but is not limited thereto.

The positive electrode of the secondary battery according to the present disclosure may optionally include a conductive agent, a binder, and a positive electrode current collector. The conductive agent is not particularly limited as long as it has conductivity without causing chemical changes in the secondary battery of the present disclosure. For example, graphite such as natural graphite, artificial graphite, or the like; carbon-based materials, such as carbon black, acetylene black, Ketjen black, channel black, furnace black, lamp black, summer black, or the like; conductive fibers, such as carbon fibers, metal fibers, or the like; carbon fluoride; metal powder, such as aluminum, nickel powder, or the like; conductive whiskers, such as zinc oxide, potassium titanate, or the like; a conductive metal oxide, such as a titanium oxide, or the like; and a conductive material, such as a polyphenylene derivative, or the like, may be used.

The content of the conductive agent may be 1 to 10 parts by weight, for example 2 to 5 parts by weight, based on 100 parts by weight of the total weight of the positive electrode active material. When the content of the conductive agent is in the above range, the finally obtained electrode may have excellent conductivity characteristics.

The binder may be used to improve the bonding strength between the active material and the conductive agent, or the like. The binder may be polyvinylidene fluoride, polyvinyl alcohol, carboxymethyl cellulose (CMC), starch, hydroxypropyl cellulose, regenerated cellulose, polyvinylpyrrolidone, polytetrafluoroethylene, polyethylene, polypropylene, ethylene-propylene-diene terpolymer (EPDM), sulfonated EPDM, styrene butadiene rubber, fluorine rubber, various copolymers, or the like. The binder may be used in an amount of 1 to 50 parts by weight, for example, 2 to 5 parts by weight, based on 100 parts by weight of the positive electrode active material. When the content of the binder satisfies the above range, the active material layer may have relatively high bonding strength.

As the positive electrode current collector, a porous body such as a mesh, mesh-like, or the like may be used, and a porous metal plate such as stainless steel, nickel, aluminum, or the like may be used, but is not limited thereto. In addition, the positive electrode current collector may be coated with an oxidation resistant metal or alloy film to prevent oxidation.

The positive electrode applied to the secondary battery of the present disclosure may be produced by directly coating and drying a composition containing a positive electrode active material on a positive electrode current collector containing a metal such as copper, or the like. Alternatively, a composition containing a positive electrode active material may be cast on a separate support and then cured to prepare a positive electrode. In this case, a separate positive electrode current collector may be not included.

According to an embodiment of the present disclosure, the liquid phase and/or gel phase electrolyte included in the first electrolytic mixing portion 151 or 251 may include a lithium salt. The lithium salt may include, for example, at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

The lithium salt may include, for example, a single material or a mixture of two or more, selected from the group consisting of LiCl, LiBr, LiI, $LiClO_4$, $LiBF_4$, $LiB_{10}Cl_{10}$, $LiPF_6$, $LiCF_3SO_3$, $LiCH_3CO_2$, $LiCF_3CO_2$, $LiAsF_6$, $LiSbF_6$, $LiAlCl_4$, $LiAlO_4$, and $LiCH_3SO_3$, and in addition thereto, may include electrolyte salts such as lithium imide salts represented by LiBETI (lithium bisperfluoroethanesulfonimide, $LiN(SO_2C_2F_5)_2$), LiFSI (lithium fluorosulfonyl imide, $LiN(SO_2F)_2$), and LiTFSI (lithium (bis)trifluoromethanesulfonimide, $LiN(SO_2CF_3)_2$), which are commonly used in the electrolyte of lithium secondary batteries. Specific examples of the lithium salt may include a single material or a mixture of two or more selected from the group consisting of $LiPF_6$, $LiBF_4$, $LiCH_3CO_2$, $LiCF_3CO_2$, $LiCH_3SO_3$, LiFSI, LiTFSI, and $LiN(C_2F_5SO_2)_2$, but is not limited thereto.

The lithium salt may be dissolved in an organic solvent, and may be included in the first electrolytic mixing portion 151 or 251 in a liquid phase. The organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, chloroethylene carbonate, benzonitrile, acetonitrile, tetrahydrofuran, 2-methyltetrahydrofuran, γ-butyrolactone, 1,3-dioxolane, 4-methyldioxolane, N,N-dimethyl formamide, N,N-dimethyl acetamide, dimethylsulfoxide, dioxane, 1,2-dimethoxyethane, sulfolane, dichloroethane, chlorobenzene, nitrobenzene, diethylene glycol, dimethyl ether, or mixtures thereof, but is not limited thereto.

When the lithium salt is dissolved in an organic solvent, a concentration of the lithium salt may be 0.1 to 5.0 M. In the above concentration range, the liquid phase and/or gel phase electrolyte contained in the first electrolytic mixing portion, described above, may be suitably used, even in the case of the gel phase described below while exhibiting relatively high ionic conductivity.

In addition, when the lithium salt is included in the first electrolytic mixing portion 151 or 251 in a gel form, the first electrolytic mixing portion 151 or 251 may include a polymer. The polymer is not particularly limited, as long as it may form a gel phase. Non-limiting examples of such a polymer include polyethylene oxide (PEO), poly (methyl methacrylate) (PMMA), polypropylene oxide (PPO), polyvinylidene fluoride (PVdF), polyvinylidene fluoride-hexafluoro propylene (PVdF-HFP), polystyrene (PS), polyvinyl chloride (PVC), polyvinyl alcohol (PVA), polyacrylonitrile (PAN), polyester sulfide (PES), or derivatives thereof.

The polymer is not particularly limited in terms of content, if the lithium salt forms a gel and/or sol phase. For example, the polymer may be 1 to 50% by weight of the total weight of the total liquid phase and/or gel phase electrolyte.

A method of allowing the liquid phase and/or gel phase electrolyte of the present disclosure to be included in the first electrolytic mixing portion 151 or 251 is not particularly limited. For example, when the body including the positive electrode, the negative electrode, and the solid electrolyte is formed by firing, the positive electrode, the negative electrode, and/or the solid electrolyte may have a recess and/or a pore on surfaces thereof due to firing shrinkage. When the electrolyte to be applied is a liquid, a body including the liquid phase electrolyte may be manufactured by immersing the body in which the recess and/or pore are formed in the liquid phase electrolyte to absorb the electrolyte, and then forming an insulating film on the outside thereof. In addition, when the electrolyte to be applied is a gel, a polymer matrix may be prepared by mixing a precursor and a curing agent of the above-mentioned polymer in the liquid phase electrolyte, inducing a cross-linking reaction by immersing the body in the mixed solution, absorbing the mixed solution, heating the same, and the like, to form an electrolyte on the gel in the electrolytic mixing portion.

In an embodiment of the present disclosure, the first electrolytic mixing portion 151 or 251 of the secondary battery according to the present disclosure may have a thickness in the range of 1.0 μm to 100.0 μm. The thickness may be 1.0 μm or more, 1.2 μm or more, 1.4 μm or more, 1.6 μm or more, 1.8 μm or more, or 2.0 μm or more, and may be 100 μm or less, or 90 μm or less, but is not limited thereto.

In an embodiment of the present disclosure, the negative electrode 122 or 222 of the secondary battery 100 or 200 according to the present disclosure may include a second electrolytic mixing portion 152 or 252 at an interface of the negative electrode 122 or 222 in contact with the solid electrolyte layer 111 or 211. The second electrolytic mixing portion 152 or 252 may include a mixture of a negative electrode active material and a liquid phase and/or gel phase electrolyte. The negative electrode active material and the liquid phase and/or gel phase electrolyte may be randomly mixed, for example, but are not limited thereto. In the present specification, the second electrolytic mixing portion 152 or 252 may refer to a region in which the negative electrode active material and the liquid phase and/or gel phase electrolyte are present together. For example, referring to FIGS. 4A and 4B, the second electrolytic mixing portion may refer to a region (e.g., 152 or 252) in which the negative electrode active material of the negative electrode 122 or 222, and the liquid phase and/or gel phase electrolyte present in a region in which the negative electrode active material is not disposed, are disposed together.

The negative electrode 122 or 222 included in the secondary battery 100 or 200 according to the present disclosure may have a recess or a pore, formed on surfaces thereof. The recess may refer to a shape in which a groove is formed on the surfaces of the negative electrode 122 or 222, and the pore may refer to a void disposed below the surfaces of the negative electrode 122 or 222. When the negative electrode 122 or 222 of the secondary battery according to the present disclosure has the pore, the surfaces of the negative electrode 122 or 222 may be porous.

When the recess is formed on the surfaces of the negative electrode 122 or 222, an average surface roughness of the negative electrode 122 or 222 may be 1.0 μm or more. The average surface roughness of the negative electrode 122 or 222 may be 1.0 μm or more, 1.2 μm or more, 1.4 μm or more, 1.6 μm or more, 1.8 μm or more, or 2.0 μm or more, but is not limited thereto. In addition, an upper limit of the average surface roughness Ra of the negative electrode 122 or 222 of the secondary battery according to the present disclosure is not particularly limited, but may be, for example, 100 μm or less. Further, when the pore is formed on the surfaces of the negative electrode 122 or 222, porosity of the pores may be in the range of 0.1 to 0.8.

In an embodiment of the present disclosure, the liquid phase and/or gel phase electrolyte may be filled in the recess and/or pore disposed on the surfaces of the negative electrode 122 or 222. The liquid phase may be a concept including a sol. In the secondary battery according to the above embodiment, the recess and/or pore disposed on the surfaces of the negative electrode 122 or 222 may be disposed, and the liquid phase and/or gel phase electrolyte may be filled in the recess and/or pore. Contact between the solid electrolyte layer 111 or 211 and the negative electrode 122 or 222 may be improved. In addition, a bottle neck problem on the interface between the solid electrolyte layer 111 or 211 and the negative electrode 122 or 222 may be solved by improving the contact between the solid electrolyte layer 111 or 211 and the negative electrode 122 or 222. Therefore, an energy barrier may be lowered.

According to an embodiment of the present disclosure, a volume fraction of the liquid phase and/or gel phase electrolyte of the second electrolytic mixing portion 152 or 252 may be in the range of 0.2 to 0.8. The volume fraction may refer to a ratio of a volume of the liquid phase and/or gel phase electrolyte to the total volume of the second electrolytic mixing portion 152 or 252. The description of the liquid phase and/or gel phase electrolyte may be the same as that of the electrolyte of the first electrolytic mixing portion, and will be thus omitted.

In an embodiment of the present disclosure, the second electrolytic mixing portion 152 or 252 of the secondary battery according to the present disclosure may have a thickness in the range of 1.0 μm to 100.0 μm. The thickness may be 1.0 μm or more, 1.2 μm or more, 1.4 μm or more, 1.6 μm or more, 1.8 μm or more, or 2.0 μm or more, and may be 100 μm or less, or 90 μm or less, but is not limited thereto.

The negative electrode included in the secondary battery according to the present disclosure may include a negative electrode active material commonly used. As the negative electrode active material, a carbon-based material, silicon, silicon oxide, a silicon-based alloy, a silicon-carbon-based material composite, tin, a tin-based alloy, a tin-carbon composite, a metal oxide, or a combination thereof may be used, and a lithium metal and/or a lithium metal alloy may be included.

The lithium metal alloy may include lithium, and a metal/metalloid alloyable with lithium. Examples of the metal/metalloid alloyable with lithium may be Si, Sn, Al, Ge, Pb, Bi, Sb, a Si—Y alloy (where Y is at least one of an alkaline metal, an alkaline earth metal, Group 13 to Group 16 elements, a transition metal, and a rare earth element, except for Si), a Sn—Y alloy (where Y is at least one of an alkaline metal, an alkaline earth metal, Group 13 to Group 16 elements, a transition metal such as a lithium titanium oxide ($Li_4Ti_5O_{12}$), or the like, and a rare earth element, except for Sn), MnO ($0<x≤2$), or the like. Examples of Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In addition, an oxide of the metal/metalloid alloyable with lithium may be lithium titanium oxide, vanadium oxide, lithium vanadium oxide, $SnO_2$, $SiO_x$ ($0<x<2$), or the like. For example, the negative electrode active material may include one or more elements selected from the group consisting of Group 13 to Group 16 elements of the Periodic Table of Elements. For example, the negative electrode active material may include one or more elements selected from the group consisting of Si, Ge, and Sn.

The carbon-based material may be crystalline carbon, amorphous carbon, or a mixture thereof. The crystalline carbon may be graphite such as amorphous, plate-like, flake, spherical, or fibrous natural graphite or artificial graphite. In addition, the amorphous carbon may be soft carbon (low temperature calcined carbon), hard carbon, mesophase pitch carbide, calcined coke, graphene, carbon black, fullerene soot, carbon nanotubes, carbon fibers, and the like, but is not limited thereto.

The silicon-based alloy may be selected from the group consisting of Si, $SiO_x$ ($0<x<2$, for example 0.5 to 1.5), Sn, $SnO_2$, or a silicon-containing metal alloy, and mixtures thereof. The silicon-containing metal alloy may include, for example, silicon, and one or more of Al, Sn, Ag, Fe, Bi, Mg, Zn, in, Ge, Pb, and Ti.

The negative electrode may be manufactured according to almost the same method, except that the negative electrode active material is used instead of the positive electrode active material in the aforementioned positive electrode manufacturing process.

In an embodiment of the present disclosure, the solid electrolyte layer according to the present disclosure may be one or more selected from the group consisting of a garnet-type solid electrolyte layer, a sodium super ionic conductor (NASICON)-type solid electrolyte layer, a lithium super ionic conductor (LISICON)-type solid electrolyte layer, a perovskite-type solid electrolyte layer, and a lithium phosphorus oxynitride (LiPON)-type solid electrolyte layer.

The garnet-type solid electrolyte layer may refer to a layer including lithium-lanthanum zirconium oxide (LLZO) represented by $Li_aLa_bZr_cO_{12}$ such as $Li_7La_3Zr_2O_{12}$, or the like, and the NASICON-type solid electrolyte layer may refer to a layer including lithium-aluminum-titanium-phosphate (LATP) represented by $Li_{1+x}Al_xTi_{2-x}(PO_4)_3$ ($0<x<1$) in which Ti has been introduced into $Li_{1+x}Al_xM_{2-x}(PO_4)_3$ (LAMP) type compound (where $0<x<2$, M=Zr, Ti, or Ge), lithium-aluminum-germanium-phosphate (LAGP) represented by $Li_{1+x}Al_xGe_{2-x}(PO_4)_3$ ($0<x<1$) such as $Li_{1.3}Al_{0.3}Ti_{1.7}(PO_4)_3$ into which excess lithium has been introduced; and/or lithium-zirconium-phosphate (LZP) represented by $LiZr_2(PO_4)_3$.

In addition, the LISICON-type solid electrolyte layer may refer to a layer including solid solution oxides including $Li_4Zn(GeO_4)_4$, $Li_{10}GeP_2O_{12}$(LGPO), $Li_{3.5}Si_{0.5}P_{0.5}O_4$, $Li_{10.42}Si(Ge)_{1.5}P_{1.5}Cl_{0.08}O_{11.92}$, or the like, represented by $xLi_3AO_4$-$(1-x)Li_4BO_4$ (where A=P, As, V, or the like, and B=Si, Ge, Ti, or the like), and solid solution sulfides including $Li_2S$—$P_2S_5$, $Li_2S$—$SiS_2$, $Li_2S$—$SiS_2$—$P_2S_5$, $Li_2S$—$GeS_2$, or the like, represented by $Li_{4-x}M_{1-y}M'_y{}'S_4$ (where M=Si or Ge, and M'=P, Al, Zn, or Ga).

The perovskite-type solid electrolyte layer may refer to a layer including lithium-lanthanum-titanate (LLTO) represented by $Li_{3x}La_{2/3-x}à_{1/3-2x}TiO_3$ ($0<x<0.16$, à=vacancies) such as $Li_{1/8}La_{5/8}TiO_3$, or the like, and the LiPON-type solid electrolyte layer may refer to a layer including a nitride such as lithium-phosphorous-oxynitride such as $Li_{2.8}PO_{3.3}N_{0.46}$, or the like.

In an embodiment of the present disclosure, ionic conductivity of the solid electrolyte applied to the secondary battery of the present disclosure may be $10^{-3}$ S/cm or more. The ion conductivity may be a value measured at a temperature of 25° C. The ion conductivity may be $1×10^{-3}$ S/cm or more, $2×10^{-3}$ S/cm or more, $3×10^{-3}$ S/cm or more, $4×10^{-3}$ S/cm or more, or $5×10^{-3}$ S/cm or more, and an upper limit thereof is not particularly limited, but may be, for example, $1×10^0$ S/cm. When using a solid electrolyte that satisfies the ion conductivity within the above range, the secondary battery according to the present disclosure may exhibit a relatively high output.

The secondary battery according to the present disclosure may include a cover portion (not illustrated). The cover portion may be disposed on a third surface S3 to a sixth surface S6 (referring to S3 to S6 of S1 to S6 shown in FIG. 6) of the body 110 or 210. The cover portion may be made of an insulating material, and may be formed by attaching a film such as a polymer resin, or the like, or by applying a ceramic material on a body and then firing it.

In the secondary battery according to the present disclosure, the first external electrode 131 or 231 and the second external electrode 132 or 232 may be disposed on both surfaces of the body in the first direction (the X direction). The first external electrode 131 or 231 may be respectively connected to the positive electrode 121 or 221, and the second external electrode 132 or 232 may be respectively connected to the negative electrode 122 or 222.

The first external electrode 131 or 231 and the second external electrode 132 or 232 may include a conductive metal and glass. The conductive metal may be, for example, one or more conductive metals of copper (Cu), nickel (Ni), tin (Sn), palladium (Pd), platinum (Pt), gold (Au), silver (Ag), tungsten (W), titanium (Ti), lead (Pb), and alloys thereof, but is not limited thereto. In addition, the glass included in the first external electrode 131 or 231 and the second external electrode 132 or 232 may have a composition in which oxides are mixed. The glass may be, for example, one or more selected from the group consisting of silicon oxide, boron oxide, aluminum oxide, transition metal oxide, alkali metal oxide, and alkaline earth metal oxide, but is not limited thereto. The transition metal may be selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline earth metal may be one or more selected from the group consisting of magnesium (Mg), calcium (Ca), strontium (Sr), and barium (Ba).

The method of forming the first external electrode 131 or 231 and the second external electrode 132 or 232 is not particularly limited. For example, a body may be dipped into a conductive paste including a conductive metal and glass, or the conductive paste may be printed on a surface of the body by a screen-printing process or a gravure printing process, to form the external electrodes. In addition, various methods, such as applying the conductive paste to the surface of the body or transferring a dry film formed by drying the conductive paste onto the body may be used, but are not limited thereto.

Figure 5:
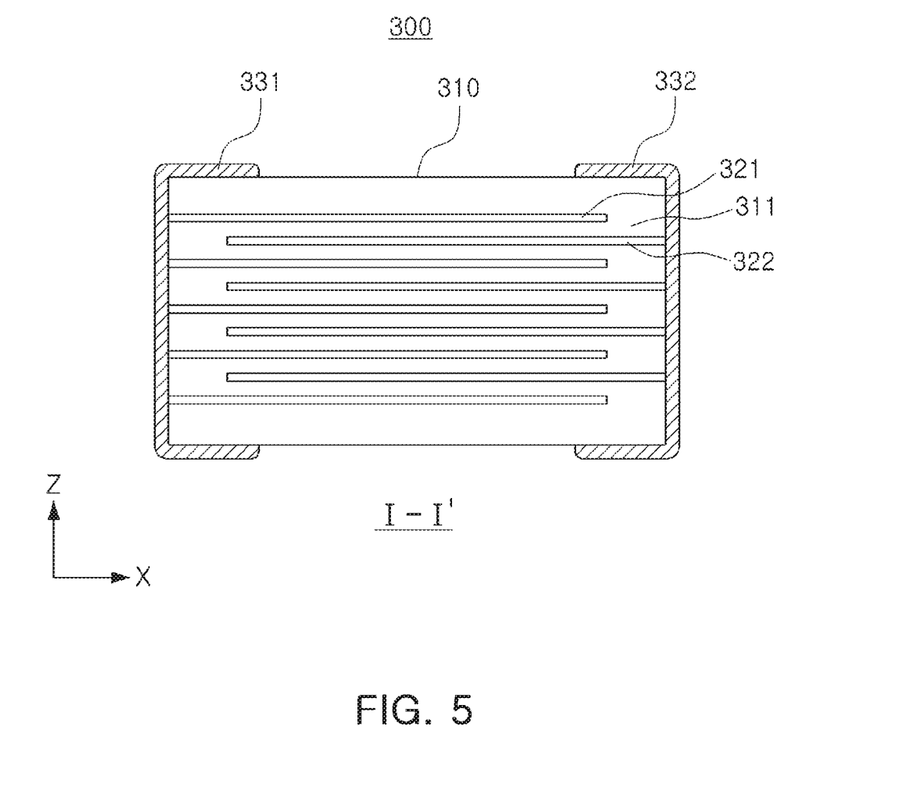
FIG. 5 is a cross-sectional view of a secondary battery according to another embodiment of the present disclosure.
Figure 6:
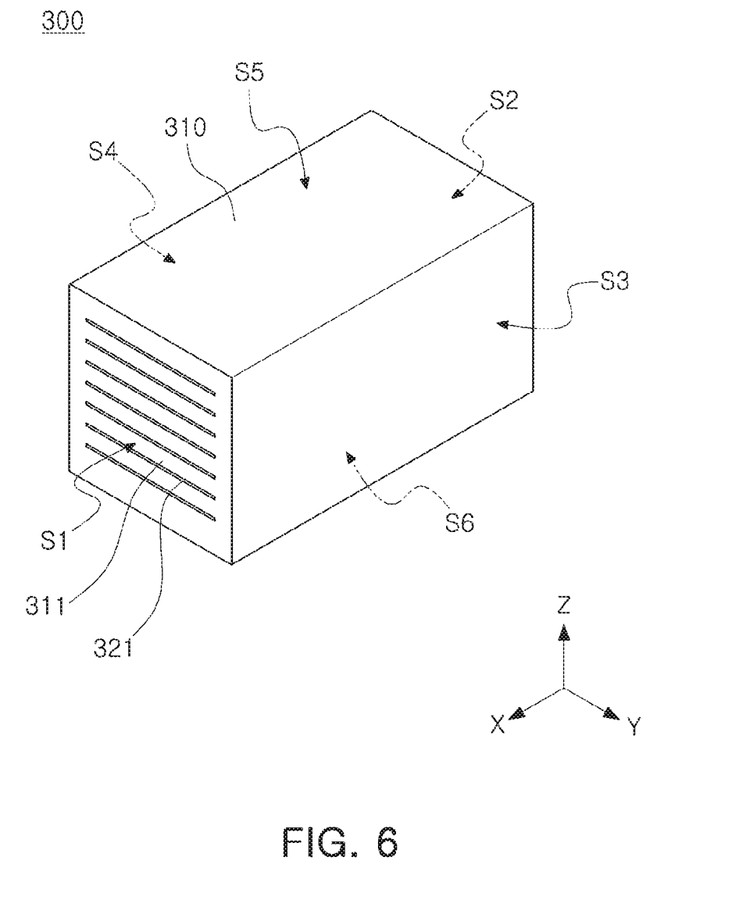
FIG. 6 is a perspective view schematically illustrating the body of FIG. 5.

According to another embodiment of the present disclosure, the secondary battery of the present disclosure may include the positive and negative electrode in plural, respectively, and the positive electrode, the solid electrolyte layers, and the negative electrode may be sequentially stacked in plural. FIG. 5 is a cross-sectional view of a secondary battery according to another embodiment of the present disclosure, and FIG. 6 is a perspective view schematically illustrating a body 310 according to this embodiment. Referring to FIGS. 5 and 6, a positive electrode 321 and a negative electrode 322 may be disposed, in plural, to face each other with a solid electrolyte layer 311 interposed therebetween. The positive electrode 321 may be exposed from a first surface S1 of the body 310, and a portion exposed from the first surface S1 of the body 310 may be connected to the first external electrode 331. In addition, the negative electrode 322 may be exposed from a second surface S2 of the body 310, and a portion exposed from the second surface S2 of the body 310 may be connected to the second external electrode 332. As described above, when the plurality of positive and negative electrodes facing each other are included, the secondary battery according to the present disclosure may realize relatively high capacity, relatively high energy density, and/or relatively high current.

In the above embodiment, the first electrolytic mixing portion and the second electrolytic mixing portion may be disposed on the surfaces of the positive electrode 321 and the negative electrode 322 disposed to face each other with the solid electrolyte layer 311 interposed therebetween. The first electrolytic mixing portion and the second electrolytic mixing portion may be disposed on the surfaces of the plurality of positive electrodes 321 and the plurality of the negative electrodes 322, respectively, to further improve contact between the solid electrolyte layer 311 and the electrodes. A description of the first and second electrolytic mixing portions is the same as described above, and will be thus omitted.

According to an embodiment of the present disclosure, a secondary battery having improved interface contact between an electrode and an electrolyte may be provided.

According to another embodiment of the present disclosure, a secondary battery having relatively high ion conductivity may be provided.

According to another embodiment of the present disclosure, a secondary battery having excellent charge and discharge efficiency may be provided.

However, various and advantageous advantages and effects of the present disclosure is not limited to the above description, and will be more readily understood in the course of describing specific embodiments of the present disclosure.

While embodiments have been illustrated and described above, it will be apparent to those skilled in the art that modifications and variations could be made without departing from the scope of the present disclosure as defined by the appended claims.

What is claimed is:

1. A secondary battery comprising:
   a body including positive electrodes and negative electrodes stacked in one direction with solid electrolyte layers interposed therebetween;
   a first external electrode disposed on one surface of the body from which the positive electrodes extend, and connected to the positive electrodes; and
   a second external electrode disposed on the other surface of the body, which opposes the one surface in another direction different from the one direction and from which the negative electrodes extend, and connected to the negative electrodes,
   wherein one of the positive electrodes comprises a positive electrode active material layer and a first electrolytic mixing portion disposed at an interface of the one of the positive electrodes in contact with one of the solid electrolyte layers,
   wherein one of the negative electrodes comprises a negative electrode active material layer and a second electrolytic mixing portion disposed at an interface of the one of the negative electrodes in contact with the one of the solid electrolyte layers,
   wherein the first electrolytic mixing portion and the second electrolytic mixing portion are in direct contact with the one of the solid electrolyte layers and are disposed on opposing sides of the one of the solid electrolyte layers,
   wherein the first electrolytic mixing portion is a mixture of a positive electrode active material and a liquid phase and/or gel phase electrolyte, and the second electrolytic mixing portion is a mixture of a negative electrode active material and a liquid phase and/or gel phase electrolyte,
   wherein the solid electrolyte layers comprise oxides,
   wherein a center portion of the one of the solid electrolyte layers, disposed between the first electrolytic mixing portion and the second electrolytic mixing portion in the one direction, is spaced apart from the liquid phase and/or gel phase electrolyte of the first electrolytic mixing portion and the liquid phase and/or gel phase electrolyte of the second electrolytic mixing portion,
   wherein a center portion of the one of the positive electrodes in the one direction is spaced apart from any liquid phase and/or gel phase electrolyte,
   wherein a center portion of the one of the negative electrodes in the one direction is spaced apart from any liquid phase and/or gel phase electrolyte,
   wherein the one of the positive electrodes comprises at least one or more of a recess or a pore on a surface of the one of the positive electrodes, and
   wherein the liquid phase or gel phase electrolyte is disposed in the recess and/or the pore.

2. The secondary battery according to claim 1, wherein a volume fraction of the liquid phase or gel phase electrolyte in the first electrolytic mixing portion with respect to the total volume of the first electrolytic mixing portion is in the range of 0.2 to 0.8.

3. The secondary battery according to claim 1, wherein a thickness of the first electrolytic mixing portion is 1.0 µm or more.

4. The secondary battery according to claim 1, wherein an average surface roughness Ra of the positive electrode is 1.0 µm or more.

5. The secondary battery according to claim 1, wherein the one of the negative electrodes comprises at least one or more of a recess or a pore on a surface of the one of the negative electrodes,
   wherein the liquid phase or gel phase electrolyte is disposed in the recess and/or the pore.

6. The secondary battery according to claim 1, wherein a volume fraction of the liquid phase or gel phase electrolyte in the second electrolytic mixing portion with respect to the total volume of the second electrolytic mixing portion is in the range of 0.2 to 0.8.

7. The secondary battery according to claim 1, wherein a thickness of the second electrolytic mixing portion is 1.0 μm or more.

8. The secondary battery according to claim 1, wherein the one of the solid electrolyte layers is one or more selected from the group consisting of a garnet-type solid electrolyte layer, a sodium super ionic conductor (NASICON)-type solid electrolyte layer, a lithium super ionic conductor (LISICON)-type solid electrolyte layer, a perovskite-type solid electrolyte layer, and a lithium phosphorus oxynitride (LiPON)-type solid electrolyte layer.

9. The secondary battery according to claim 1, wherein the one of the solid electrolyte layers has an electrical conductivity of $10^{-3}$ S/cm or more.

10. The secondary battery according to claim 1, wherein the liquid phase or gel phase electrolyte comprises one or more lithium salts selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $LiSO_3CF_3$, and $LiClO_4$.

11. A secondary battery comprising:
   a body including a positive electrode and a negative electrode stacked in one direction with a solid electrolyte layer interposed therebetween;
   a first external electrode disposed on one surface of the body, and extending onto a side surface of the body from which the positive electrode extends such that the first external electrode is connected to the positive electrode at the side surface; and
   a second external electrode disposed on the other surface of the body, and extending onto the side surface of the body from which the negative electrode extends such that the second external electrode is connected to the negative electrode at the side surface, the one surface and the other surface opposing each other in the one direction,
   wherein the positive electrode comprises a positive electrode active material layer and a first electrolytic mixing portion disposed at an interface of the positive electrode in contact with the solid electrolyte layer,
   wherein the first electrolytic mixing portion is in direct contact with the solid electrolyte layer,
   wherein the first electrolytic mixing portion is a mixture of a positive electrode active material and a liquid phase and/or gel phase electrolyte,
   wherein the negative electrode comprises a negative electrode active material layer and a second electrolytic mixing portion disposed at an interface of the negative electrode in contact with the solid electrolyte layer,
   wherein the second electrolytic mixing portion is in direct contact with the solid electrolyte layer,
   wherein the second electrolytic mixing portion is a mixture of a negative electrode active material and a liquid phase and/or gel phase electrolyte,
   wherein a center portion of the solid electrolyte layer, disposed between the first electrolytic mixing portion and the second electrolytic mixing portion in the one direction, is spaced apart from the liquid phase and/or gel phase electrolyte of the first electrolytic mixing portion and the liquid phase and/or gel phase electrolyte of the second electrolytic mixing portion,
   wherein a center portion of the positive electrode in the one direction is spaced apart from any liquid phase and/or gel phase electrolyte,
   wherein a center portion of the negative electrode in the one direction is spaced apart from any liquid phase and/or gel phase electrolyte,
   wherein the positive electrode comprises at least one or more of a recess or a pore on a surface of the positive electrode, and the liquid phase or gel phase electrolyte of the first electrolytic mixing portion is disposed in the recess and/or the pore of the positive electrode, and
   wherein the negative electrode comprises at least one or more of a recess or a pore on a surface of the negative electrode, and the liquid phase or gel phase electrolyte of the second electrolytic mixing portion is disposed in the recess and/or the pore of the negative electrode.

12. The secondary battery according to claim 11, wherein a volume fraction of the liquid phase or gel phase electrolyte in the first electrolytic mixing portion with respect to the total volume of the first electrolytic mixing portion is in the range of 0.2 to 0.8.

13. The secondary battery according to claim 11, wherein an average surface roughness Ra of the positive electrode is 1.0 μm or more.

14. The secondary battery according to claim 11, wherein a volume fraction of the liquid phase or gel phase electrolyte in the second electrolytic mixing portion with respect to the total volume of the second electrolytic mixing portion is in the range of 0.2 to 0.8.

15. The secondary battery according to claim 11, wherein a thickness of the second electrolytic mixing portion is 1.0 μm or more.

16. The secondary battery according to claim 11, wherein the solid electrolyte layer is one or more selected from the group consisting of a garnet-type solid electrolyte layer, a sodium super ionic conductor (NASICON)-type solid electrolyte layer, a lithium super ionic conductor (LISICON)-type solid electrolyte layer, a perovskite-type solid electrolyte layer, and a lithium phosphorus oxynitride (LiPON)-type solid electrolyte layer.

17. The secondary battery according to claim 11, wherein the solid electrolyte layer has an electrical conductivity of $10^{-3}$ S/cm or more.

18. The secondary battery according to claim 11, wherein the liquid phase or gel phase electrolyte comprises one or more lithium salts selected from the group consisting of $LiPF_6$, $LiAsF_6$, $LiCF_3SO_3$, $LiN(CF_3SO_2)_2$, $LiBF_6$, $LiSbF_6$, $LiN(C_2F_5SO_2)_2$, $LiAlO_4$, $LiAlCl_4$, $LiSO_3CF_3$, and $LiClO_4$.

* * * * *